United States Patent [19]

Theodorides

[11] Patent Number: 5,253,831
[45] Date of Patent: Oct. 19, 1993

[54] OUTLET BOX WITH ADJUSTABLE MOUNTING POSITIONS

[76] Inventor: Panos C. Theodorides, 82 Linfield St., Holdbrook, Mass. 02343

[21] Appl. No.: 669,360

[22] Filed: Mar. 14, 1991

[51] Int. Cl.$^5$ ............................................. F16M 13/00
[52] U.S. Cl. .................. 248/27.3; 248/222.1; 248/221.3; 248/225.1; 248/906
[58] Field of Search ............ 248/906, 27.1, 27.3, 248/216.1, 297.3, 222.1, 221.3, 295.1, 298, 488, 490, 316.4, 231.4, 225.1; 220/3.3, 3.7, 3.9, 3.92

[56] References Cited

U.S. PATENT DOCUMENTS

| | | | |
|---|---|---|---|
| 1,157,739 | 10/1915 | Tyler | 182/204 |
| 1,519,735 | 12/1924 | Kruse | 248/906 X |
| 2,031,689 | 2/1936 | Buckels | 220/3.92 |
| 3,834,658 | 9/1974 | Theodorides | 248/906 X |

Primary Examiner—Alvin C. Chin-Shue
Attorney, Agent, or Firm—Wolf, Greenfield & Sacks

[57] ABSTRACT

An outlet box assembly in which the position of the box is slidably adjustable along an arm of the bracket which mounts the box to the wall. Slidably supported to one of the plurality of walls defining the outlet box is a bracket which has a support arm extending substantially parallel to the side wall of the box and a mounting arm extending substantially perpendicular thereto. The bracket support arm has a plurality of openings to engage the outlet box and the mounting arm secures the box to the wall in which the assembly is to be installed. An engagement tab extends from the side wall of the box and engages with one of the openings in the bracket support arm, thereby retaining the outlet box in a position. A flexible element coupled to the engagement tab biases the engagement tab to engage an opening in the support arm. Under finger pressure applied to the flexible member, the engagement tab may be released from engagement with a position on the arm, thereby releasing the bias and enabling the box, and the pin positioned thereon, to slide along the side wall of the box and engage with other openings in the support arm. The engagement of the outlet box with the plurality of openings on the support arm permits the outlet box to be positioned such that the open face of the outlet box is flush with the surface of the wall in which it is mounted.

8 Claims, 3 Drawing Sheets

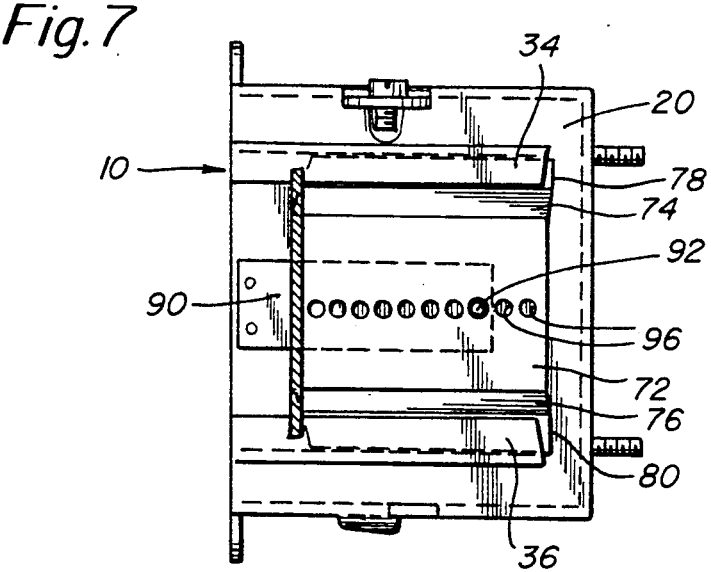

OUTLET BOX WITH ADJUSTABLE MOUNTING POSITIONS

FIELD OF INVENTION

This invention relates generally to an outlet box with an adjustable mounting, and more particularly to an outlet box which provides for improved positioning of a mounted and wired box relative to a wall stud to which the outlet box is secured.

BACKGROUND OF THE INVENTION

Electrical outlet boxes are commonly used to house electrical switches, receptacles, etc., and include an open face which lies flush with the surface of the wall in which the box is placed. During construction these outlet boxes are nailed to studs and the wiring is installed before the dry wall, lath and plaster, or paneling are applied to the studs. Once the wall panel has been applied to the studs it is often necessary to adjust the position of the outlet box with respect to the wall in order for the open face of the outlet box to lie flush with the wall. Some of the prior art adjustable outlet boxes include means for adjusting their position with respect to the wall surface after the dry wall, paneling, or lath and plaster have been applied. One problem encountered with these prior art outlet boxes, such as is shown in Theodorides U.S. Pat. No. 3,834,658, is that their mechanism for adjusting the position of the wired box is difficult, and sometimes impossible, to reach, adjust and/or manipulate once the dry wall, or lath and plaster have been applied.

It is, therefore, an object of this invention to provide an electrical outlet box having adjustable mounting positions that allows the positive engagement of an outlet box to a mounting bracket while insuring quick adjustability of the position of the box even when it is mounted on a wall and wired.

A further object of this invention is to provide an outlet box assembly having an improved adjustable mounting which can be more easily and quickly reached and adjusted than prior adjustable boxes.

A further object of this invention is to provide an electrical outlet box with an improved adjustable mounting that is constructed with few parts and is simple to manufacture and assemble.

It is yet another object of this invention to provide an electrical outlet box with an improved adjustable mounting that allows rapid location and positioning of the outlet box, even in difficult to reach locations.

SUMMARY OF THE INVENTION

The invention provides an improved mechanism for securely adjusting the position of an outlet box with respect to a wall, the adjustment mechanism being readily accessible even when the box is wired and the wall material has been applied. According to the invention, the electrical outlet box slidably engages with a support arm of a bracket which also has a mounting arm for mounting the box to a wall. The bracket support arm engages with a releasably biased engagement member which extends from a side wall of the outlet box. The support arm includes a plurality of openings for engaging with the biased engagement member, such that the position of the box with respect to the wall is adjusted by engaging the engagement member in any one of the plurality of openings in the bracket engagment arm.

Various configurations of the outlet box are desirable. For example, the biased engagement member may be mounted to the interior of the box and include a pin which extends through an opening in the side wall of the box and engages an opening in the bracket support arm. Alternatively the biased support arm may be mounted on the exterior of the side wall, have a pin or flange at its end and extend through and along a U-shaped bracket support arm to engage an opening, such as a slot or a hole in the bracket arm. In yet another configuration the engagement pin may extend from the bracket support arm to engage an opening in the side wall of the outlet box.

BRIEF DESCRIPTION OF THE DRAWING

The foregoing objects and advantages of the present invention will be more clearly understood in connection with the accompanying drawing in which:

FIG. 7 is a cross-sectional view similar to FIG. 3 of another embodiment of this invention.

DETAILED DESCRIPTION OF THE PREFERRED EMBODIMENTS

Figure 1:
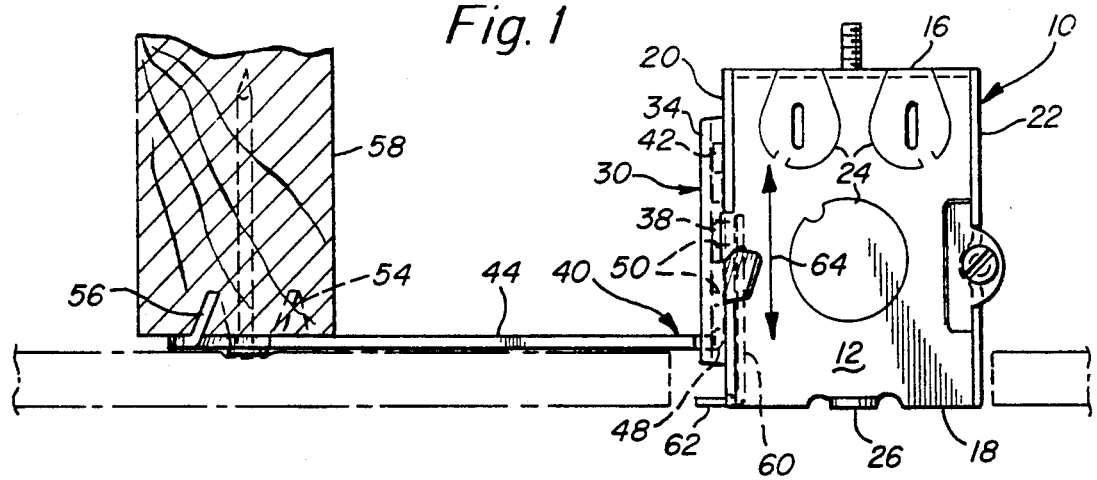
FIG. 1 is a top view of the outlet box and mounting of this invention shown secured to a wall stud.
Figure 2:
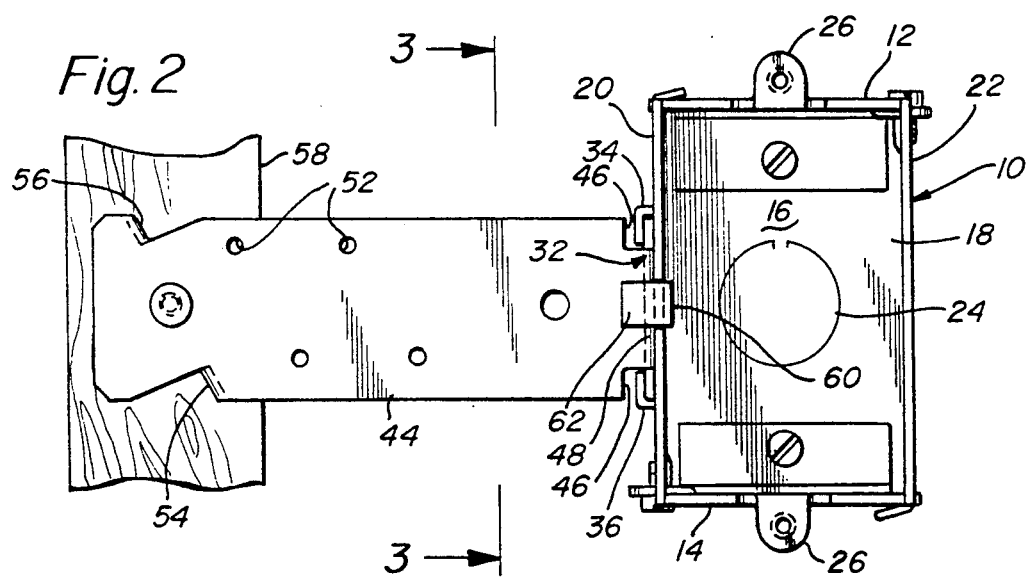
FIG. 2 is a front view of the assembly shown in FIG. 1.
Figure 3:
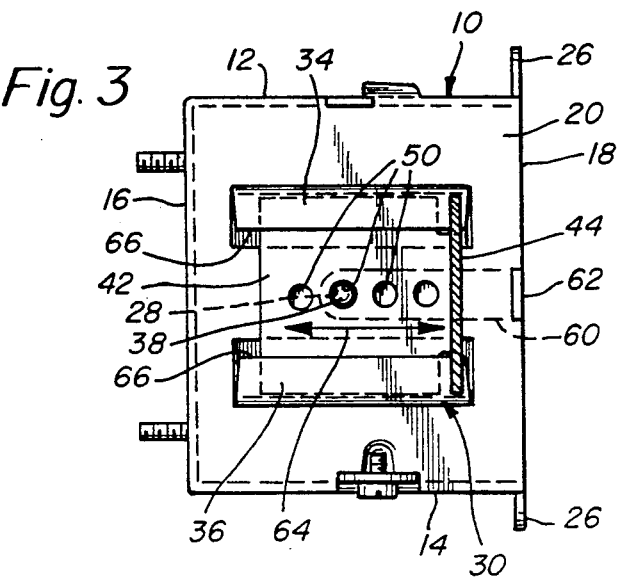
FIG. 3 is a cross-sectional view taken on the section line 3—3 of FIG. 2.

One embodiment of an electrical outlet box having adjustable mounting positions is shown in FIGS. 1-3 of the drawing and includes an electrical outlet box 10 which is slidably secured to a bracket 40 by a slide assembly 30. Outlet box 10 is of generally conventional design and includes top wall 12, bottom wall 14, side walls 20 and 22, rear wall 16 and open face 18. The top and bottom walls 12, 14 are provided with screw lugs 26 and the various walls are provided with conventional knockouts 24, the details of which are known in the art and form no part of the present invention. A slot 32 is formed in the side wall 20 by a pair of ears 34, 36 which may be integral with and extend from the same material as the side wall 26, or which may be mounted on and securely attached to the side wall 26. The ears 34, 36 extend horizontally parallel to one another so as to form the slot 32 which receives a support arm 42 of the bracket 40.

The bracket 40 is formed by a support arm 42 which extends substantially parallel to the side wall 20 of outlet box 10 and a mounting arm 44 which is formed substantially perpendicular to the support arm 42. The width of the support arm 42, as measured from its portion extending from top wall 12 to bottom wall 14, is somewhat greater than the space between the opposed edges 66 of ears 34 and 36 so that the support arm 42 is confined in the slot 32 and may not be accidentally disengaged from it, but yet is sized to slide smoothly along the slot 32. The bracket 40 also includes a notches 46 at bend 48 where the support arm 42 and mounting arm 40 join one another. The notches 46 allows the arms 42 and 44 to have the same width and to accept, and allow movement along, the inner edges of ears 34 and 36. Additionally, the notches 46 serve to further stabilize the box 10 on the bracket 40.

In use, the mounting arm 44 is nailed to a stud 58 of the wall in which the box 10 is to be mounted. A pair of triangular barbs 54, 56 and nail holes 52 are formed in the mounting arm 44 to facilitate anchoring the bracket 40 to the stud 58.

The slide assembly 30 is formed by the bracket engagment arm 42, the slot 32 which engages the bracket support arm 42, and the bracket engagment pin 38 which engages the bracket support arm 42. The bracket support arm 42 includes a plurality of holes 50 for receiving and engaging with the bracket engagment pin 38. As can be seen in the drawing, the holes 50 are substantially colinear. In the present embodiment the engagment pin 38 extends through an opening 28 in the side wall 20 of the box 10 and engages any one of the engagement holes 50 to position the outlet box 10. A leaf spring 60, or other biasing means such as a coil spring or multiple leaf spring, is riveted to and extends along the interior of side wall 20. The engagement pin 38 is mounted to the leaf spring 60, although the pin 38 could be intergral therewith, such that the leaf spring 60 biases and urges the engagment pin 38 through the side wall 20 and into engagement with the support arm 42, in a manner that the bracket 40 is retained in engagement with the outlet box 10. The bracket engagment pin 38 is releasingly biased by the leaf spring 60 such that when the pin 38 is depressed, in a direction substantially perpendicular to side wall 20, the outlet box 10 can slide along the slot 32 and the pin may engage any of the plurality of holes in the support arm 42. Therefore, when bracket engagement pin 38 is depressed, the pin 38 releases the support arm from engagement therewith and the outlet box 10 can be drawn along a length, as suggested by the arrow 64 in FIGS. 1 and 3, in the slot 32. In this way the pin 38 of box 10 may engage with the various holes 50 along support arm 42 such that the open face 18 of box 10 may be positioned in precisely the desired location.

The outlet box 10 also includes a stop tab 62 which in this embodiment extends from and is integral with the leaf spring 60. The stop tab 62 prevents unintentional disengagement of the outlet box 10 from the bracket 40. In the event disengagement and/or engagement of the box was desired, the outlet box 10 may be disengaged from the bracket 40 by depressing the pin 38 and sliding the outlet box 10 along the arm 42 forward out of the wall cavity. It is evident from examination of the drawings that any wiring, etc., disposed in box 10 will not interfere or inhibit access to the bracket support arm 42 or to the pin 38 so that the adjustment may be readily made even after the wiring is installed. It will be appreciated that the assembly thereby enables the builder to move the box in or out of the wall so that the face 18 is flush with the wall surface after the dry wall, paneling, or lath and plaster have been mounted.

Figure 4:
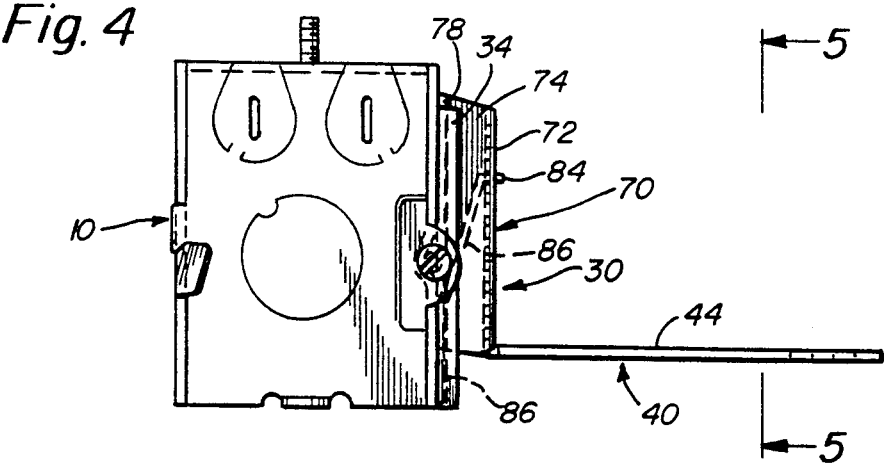
FIG. 4 is a top view of a modified form of the outlet box.
Figure 5:
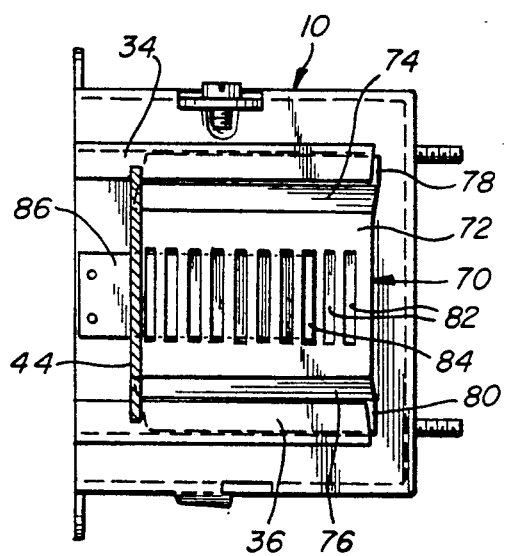
FIG. 5 is a cross-sectional view taken on the section line 5—5 of FIG. 4.
Figure 6:
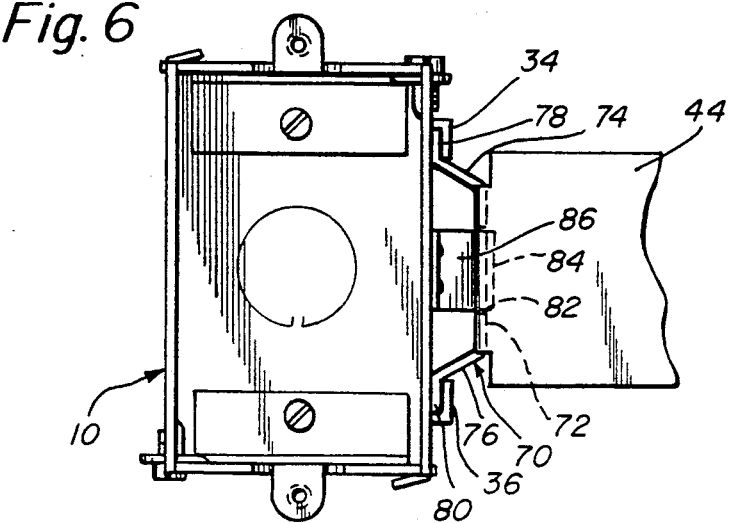
FIG. 6 is a front view of the outlet box and bracket shown in FIG. 5.

FIGS. 4-6 are illustrations of a modified embodiment of the outlet box with adjustable mounting positions. In this embodiment the leaf spring 86 is mounted on the exterior surface of the side wall 20 and engages a U-shaped support arm 70. The support arm 70 includes a flat wall segment 72, diverging wall segments 74 and 76, and laterally extending flanges 78 and 80. The flanges 78 and 80 extend behind the opposite ears 34 and 36 of the slot 32. In this embodiment the leaf spring 86 is mounted, by soldering, rivets, spot welding or an adhesive, to the exterior of the side wall 20 and extends partially along the length thereof. At the end opposite its mounting, the leaf spring 86 has a projection 84 in the form of a flange 84 which engages with the slots 82 formed in the flat wall segment 72 of the arm 70. The slots 82 of the support arm 70 are formed to receive and securely engage the engagement tab 84 therein. In use, the leaf spring 86 is depressed to release the engagement tab 84 from engagement with one of the plurality of slots or holes 82, the side wall 20 may then slide along the support arm 70 so that the engagement tab 84 engages the appropriate slot 82 and the open face 18 is positioned flush with the wall in which it is mounted. This alternative configuration is in all other respects the same as the previously described embodiment.

FIG. 7 is an illustration of yet another modified embodiment of the outlet box having adjustable mounting positions. In this embodiment the leaf spring 90 is mounted, by spot welding, soldering, rivets, or an adhesive, to the exterior of the side wall 20 and extends partially along the length thereof. At the end opposite its mounting, the leaf spring 90 has a pin 92 which engages with the holes, or openings 96 formed in the flat wall segment 72. The holes or openings 96 of the support arm 70 are formed to receive and securely engage the pin 92. In use, the leaf spring 90 is depressed to release the pin 92 from engagement with one of the plurality of openings 96, the side wall 20 may then slide along the support arm 70 so that the appropriate opening 96 is engaged by the pin 92 and the open face 18 is positioned flush with the wall in which it is mounted. This alternative configuration is in all other respects the same as the previously described embodiment.

The foregoing detailed description is meant to be illustrative, and not limiting. It will be understood by those of ordinary skill in the art that various modifications can be made without departing from the spirit or scope of the invention. The preceding description is meant to describe only preferred embodiments and not to limit the scope of the invention.

What is claimed is:

1. An outlet box assembly comprising:
    side, top, bottom and rear walls defining an outlet box,
    a bracket slidably supported to the exterior of one side wall of the box, said bracket having a support arm substantially parallel to the side wall of the box and a mounting arm substantially perpendicular to the side wall of the box, said mounting arm being adapted to be secured by fastening means in a wall in which the assembly is to be installed,
    said support arm having a plurality of holes,
    a bracket engaging pin extending through the side wall of the box for engaging said plurality of holes to control the slidable movement of the box relative to the bracket,
    flexible biasing means coupled to said pin for biasing said pin into engagement with said one of the plurality of holes in said support arm and further for retaining said bracket in engagement with said bracket engaging pin, wherein depression of said pin permits movement of said outlet box relative to said bracket, such that the bracket engaging pin can engage with any of the plurality of holes in said bracket engaging arm to properly position the outlet box with respect to the wall in which it is mounted, and a stop tab extending from the side wall of said outlet box for preventing unintentional disengagement of said outlet box from said bracket, said stop tab being a flange formed from and integral with said biasing means.

2. An outlet box assembly as defined in claim 1, further characterized by said biasing means being coupled to the interior of the side wall of said outlet box.

3. An outlet box assembly as defined in claim 1, further characterized by said side wall having a pair of parallel and oppositely mounted ears for slidably retaining said support arm.

4. An outlet box assembly as defined in claim 1, further characterized by said outlet box being mounted for movement by means substantially exterior of said outlet box whereby said outlet box is substantially free of inwardly extending projections from said bracket and the engaging pin.

5. An outlet box assembly as defined in claim 1, further characterized by said bracket engaging pin being freely depressable through the side wall in the outlet box and permitting movement of the outlet box along a length spaced from and paralleling the support arm.

6. An outlet box assembly as defined in claim 1, further characterized by said plurality of holes being formed to receive said pin and having a diameter that permits both the free depression and engagement of said pin therethrough.

7. An outlet box assembly as defined in claim 1, further characterized by said biasing means being mounted to the interior of the outlet box side wall.

8. An outlet box assembly as defined in claim 7, further characterized by said biasing means extending through an opening in the side wall of said outlet box.

* * * * *